H. E. WERNER AND J. H. MITCHELL.
WIRE FORMING MACHINE.
APPLICATION FILED FEB. 6, 1919.

1,333,049.

Patented Mar. 9, 1920.
8 SHEETS—SHEET 1.

Inventors
Henry E. Werner
Jordan H. Mitchell

By Hardway & Cathy
Attorneys

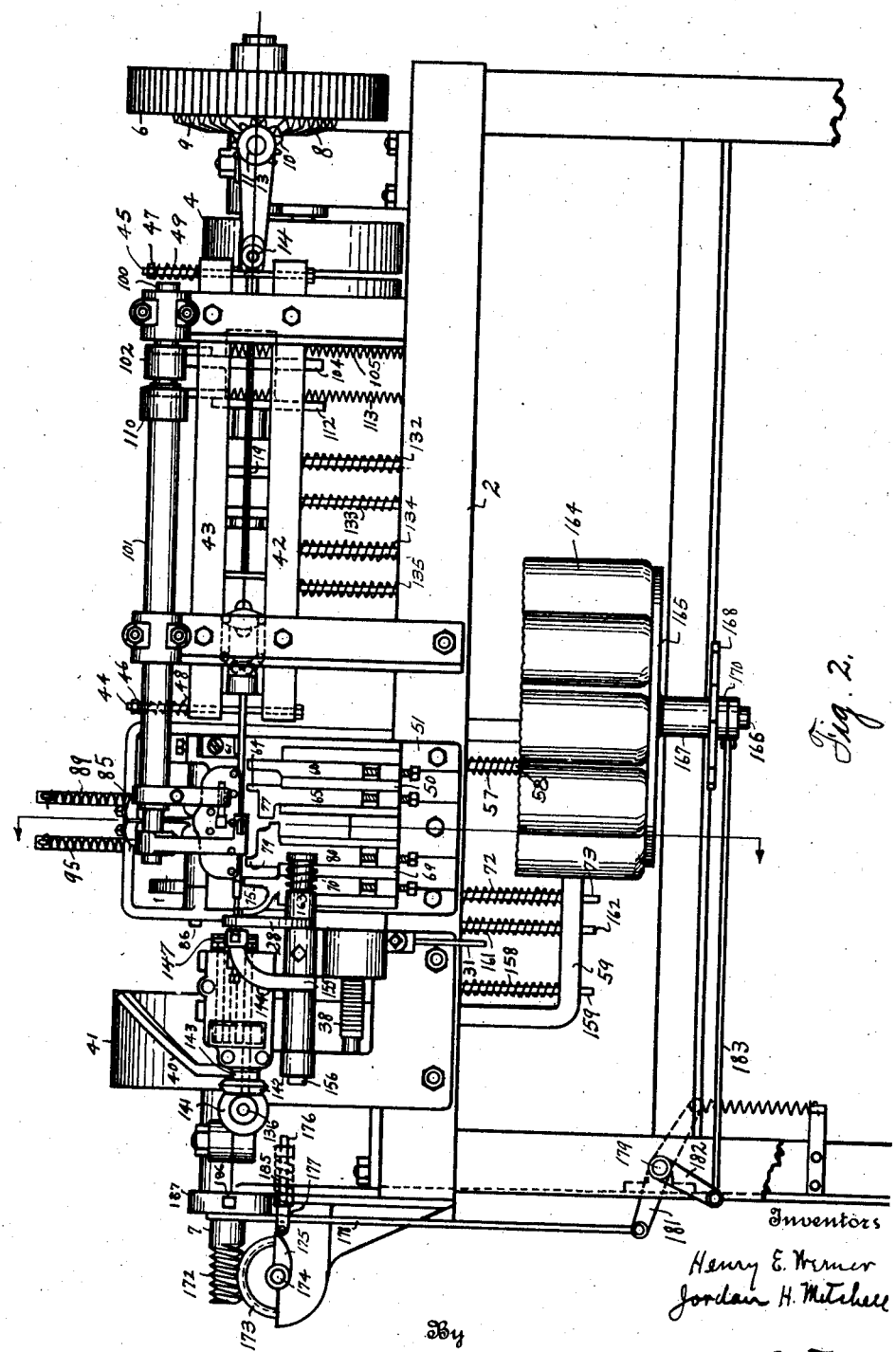

H. E. WERNER AND J. H. MITCHELL.
WIRE FORMING MACHINE.
APPLICATION FILED FEB. 6, 1919.

1,333,049.

Patented Mar. 9, 1920.
8 SHEETS—SHEET 3.

Inventors
Henry E. Werner
Jordan H. Mitchell
By
Hardway Catlin
Attorneys

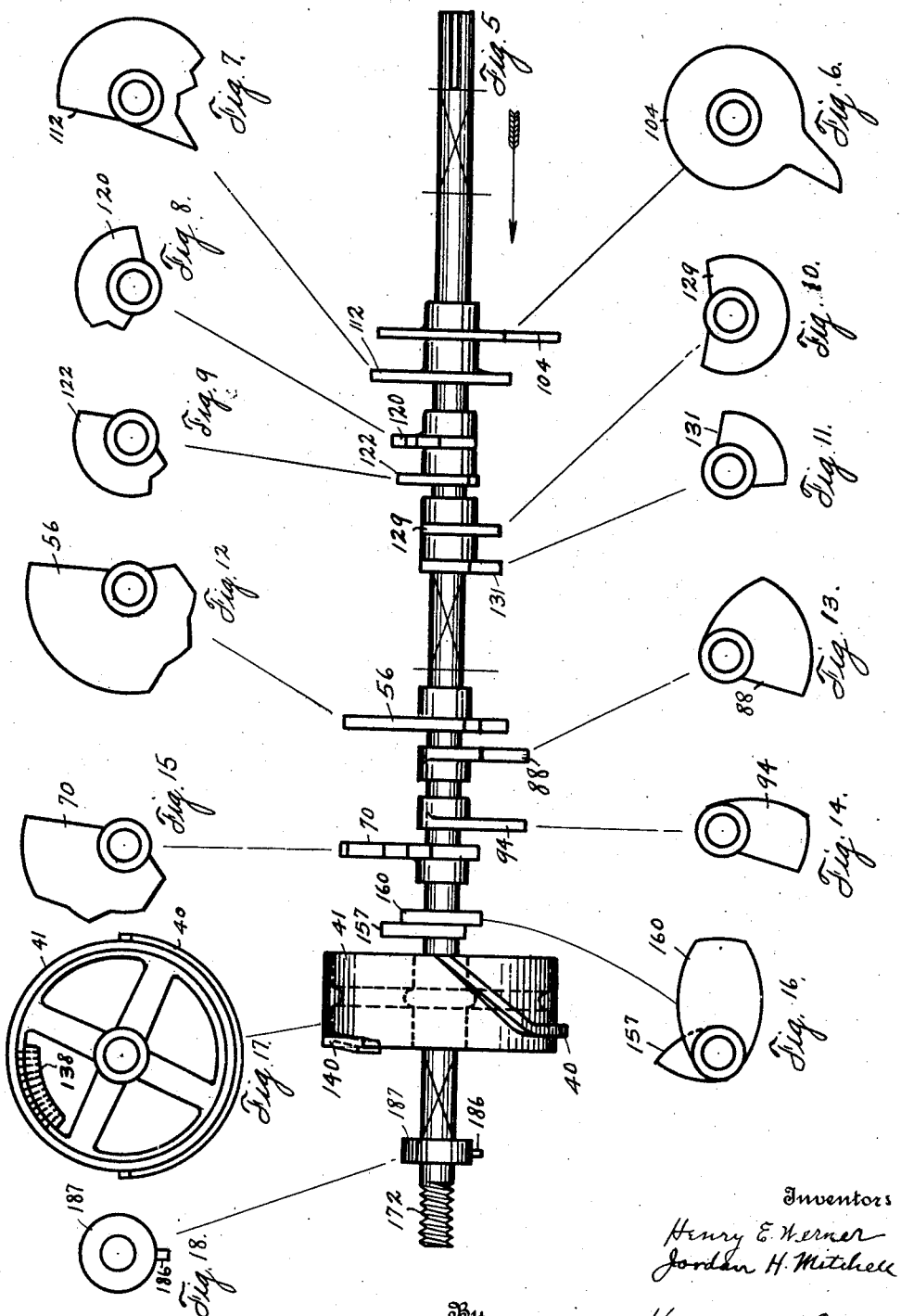

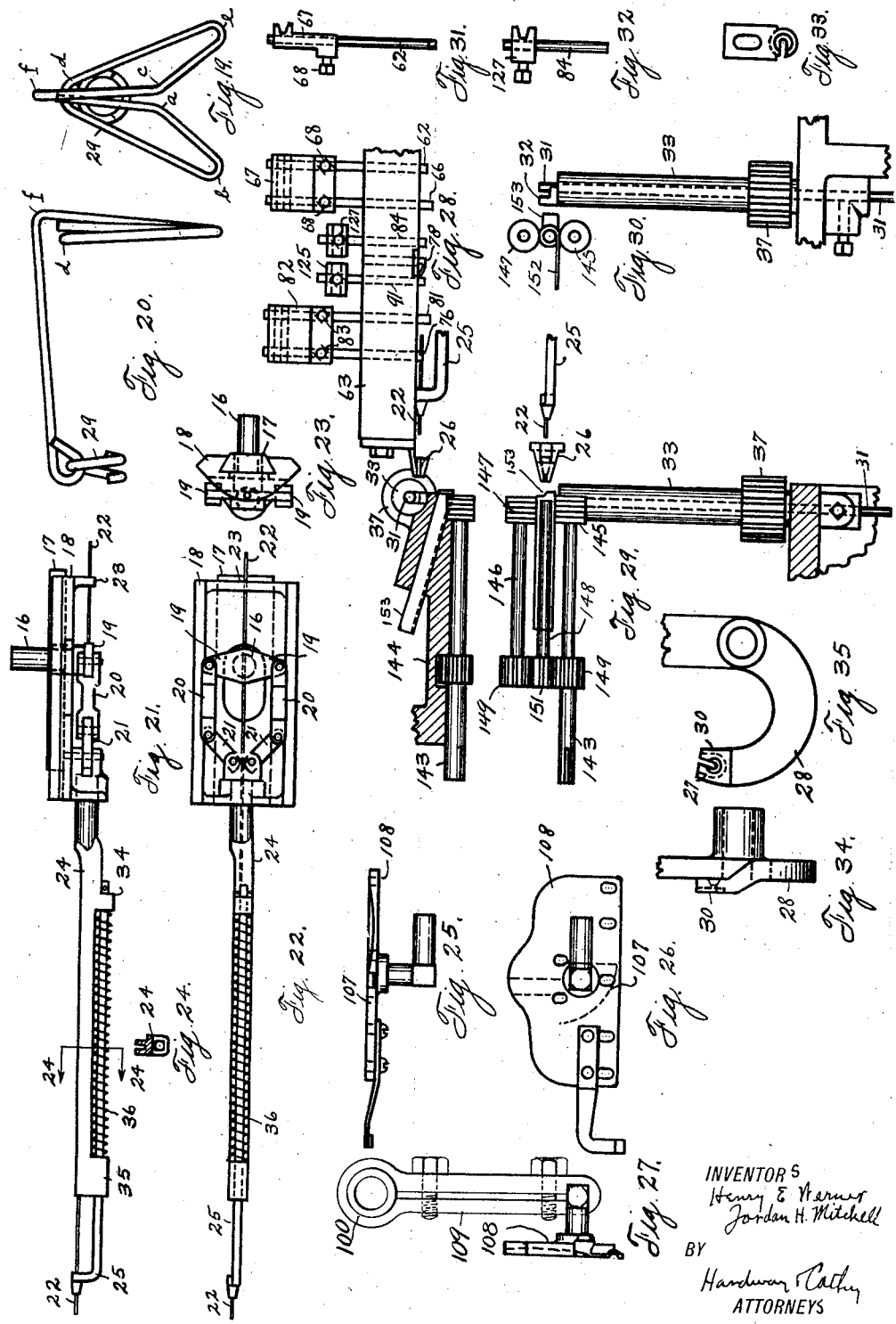

H. E. WERNER AND J. H. MITCHELL.
WIRE FORMING MACHINE.
APPLICATION FILED FEB. 6, 1919.

1,333,049.

Patented Mar. 9, 1920.
8 SHEETS—SHEET 6.

Inventors
Henry E. Werner
Jordan H. Mitchell

By

Hardway & Cathey
Attorneys

H. E. WERNER AND J. H. MITCHELL.
WIRE FORMING MACHINE.
APPLICATION FILED FEB. 6, 1919.

1,333,049.

Patented Mar. 9, 1920.
8 SHEETS—SHEET 7.

INVENTORS
Henry E. Werner
Jordan H. Mitchell
BY
Hardway Cathy
ATTORNEYS.

H. E. WERNER AND J. H. MITCHELL.
WIRE FORMING MACHINE.
APPLICATION FILED FEB. 6, 1919.

1,333,049.

Patented Mar. 9, 1920.
8 SHEETS—SHEET 8.

INVENTOR.
Henry E. Werner
Jordan H. Mitchell
BY
Hardway Carting
ATTORNEYS

UNITED STATES PATENT OFFICE.

HENRY E. WERNER AND JORDAN H. MITCHELL, OF HOUSTON, TEXAS.

WIRE-FORMING MACHINE.

1,333,049.  Specification of Letters Patent.  Patented Mar. 9, 1920.

Substitute for application Serial No. 183,476, filed July 30, 1917. This application filed February 6, 1919. Serial No. 275,317.

*To all whom it may concern:*

Be it known that we, HENRY E. WERNER and JORDAN H. MITCHELL, citizens of the United States, residing at Houston, in the county of Harris and State of Texas, have invented certain new and useful Improvements in Wire-Forming Machines, of which the following is a specification.

This invention relates to new and useful improvements in a wire forming machine and has particular relation to a machine of the character described by which wire is formed into clothes pins, and this application has been filed as a substitute for our original application filed on July 30, 1917, Serial No. 183,476.

The object of the invention is to provide a device of the character described into which wire is fed and whereby said wire is automatically formed into clothes pins.

Another feature of the invention resides in the provision of means for forming a split ring and attaching the pin thereto, said ring being provided for the purpose of suspending the pin from the clothes line.

A further feature of the device resides in the provision of means for feeding the wire into the machine.

A still further feature of the invention resides in the provision of a receiver provided to receive the pins discharged from the machine in quantities containing a predetermined number of pins.

With the above and other objects in view, the invention has particular relation to certain novel features of construction, operation and arrangement of parts, an example of which is given in this specification and illustrated in the accompanying drawings, wherein:

Fig. 2, is a side elevation thereof.

Fig. 5, is a plan view of the cam shaft, showing the cams mounted thereon in their relative positions.

Figs. 6 to 18, inclusive, show end elevations of the respective cams of said shaft as viewed from the right hand end thereof, as indicated by the arrow in Fig. 5.

Figs. 19 and 20, show end and side elevations, respectively, of the wire clothes pin as formed by the machine.

Figs. 21, 22, and 23, are plan, side and end views, respectively, of the wire feed mechanism.

Fig. 24 is a sectional view of the needle taken on the line 24—24 of Fig. 21.

Figs. 25, 26, and 27 are plan, side and end views, respectively, of the guide plate employed.

Figs. 28, 29 and 30 show plan, side and end elevations respectively of the mechanism for forming the wire split ring showing also the adjacent parts of the pin former.

Figs. 31 and 32 are side elevations of the two forms of slidable formers employed.

Fig. 33 shows the needle guide of the feed mechanism.

Figs. 34 and 35 are fragmentary side and end elevations respectively, of the transfer arm of the machinery for forming the split rings.

Figure 36:
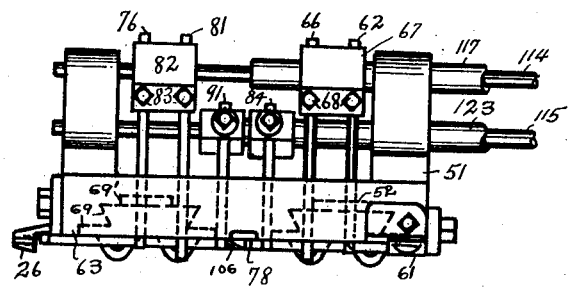
Figure 37:
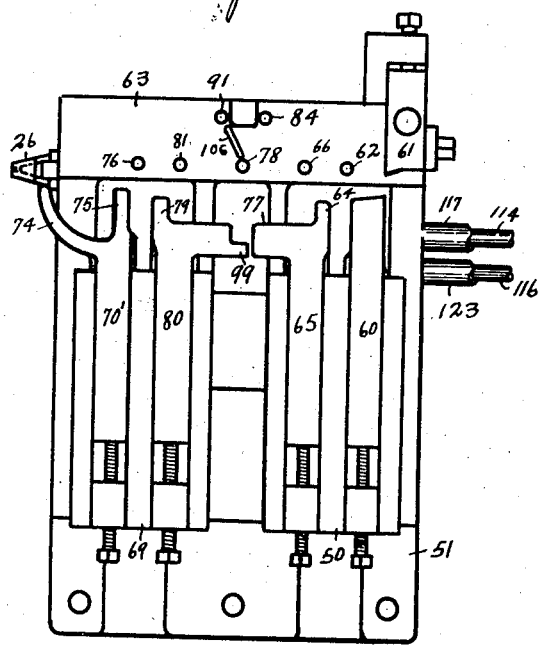
Figure 38:
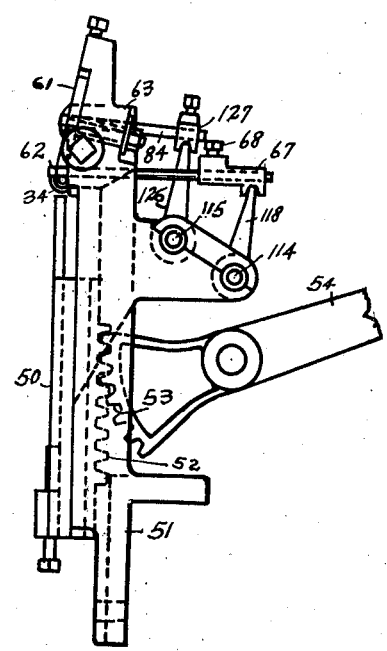

Figs. 36, 37 and 38, are enlarged plan, side and end views, respectively, of the wire forming mechanism by means of which the pins are formed.

Figure 39:
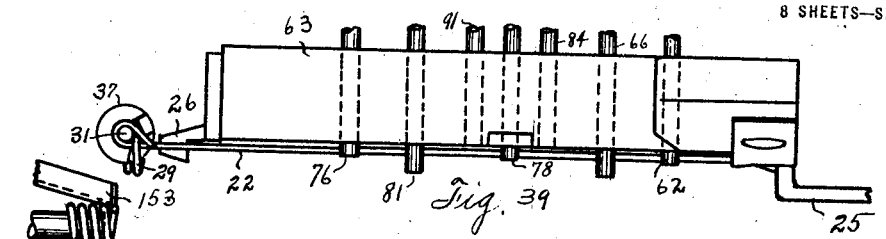
Figure 40:
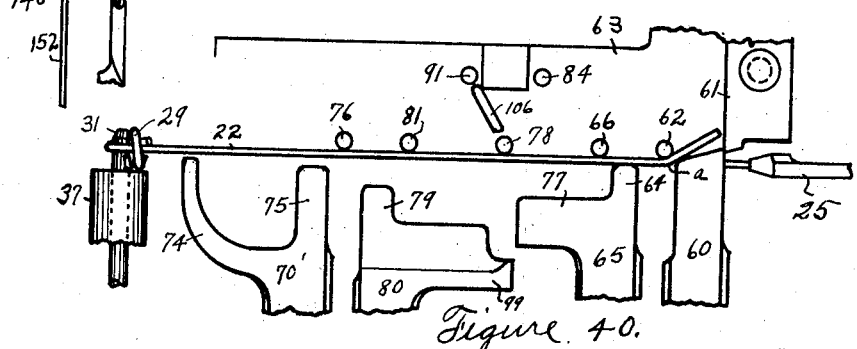
Figure 41:
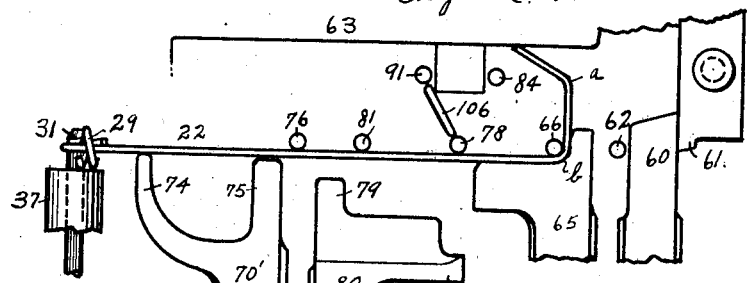
Figure 42:
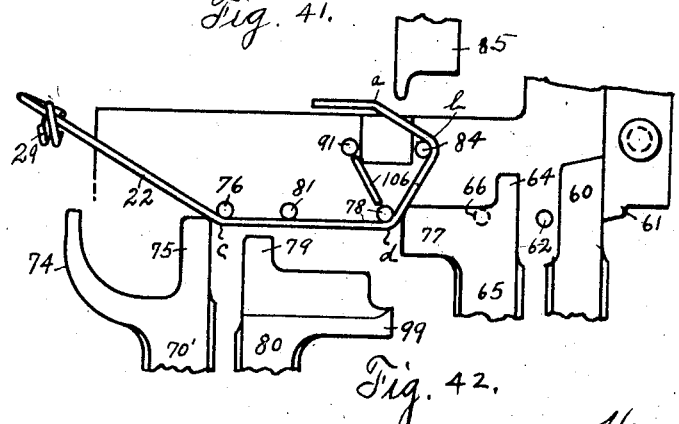
Figure 43:
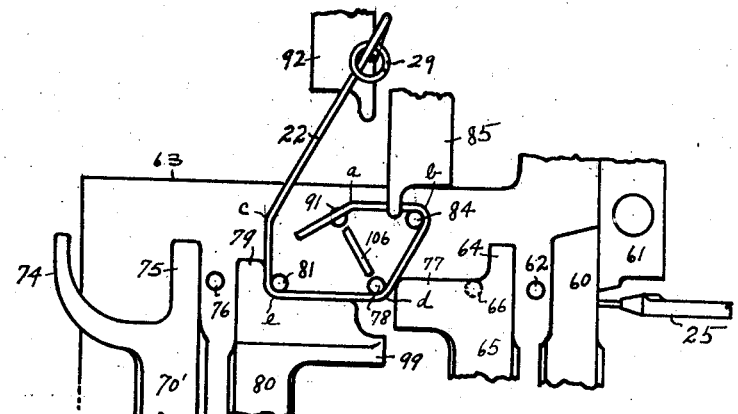
Figure 44:
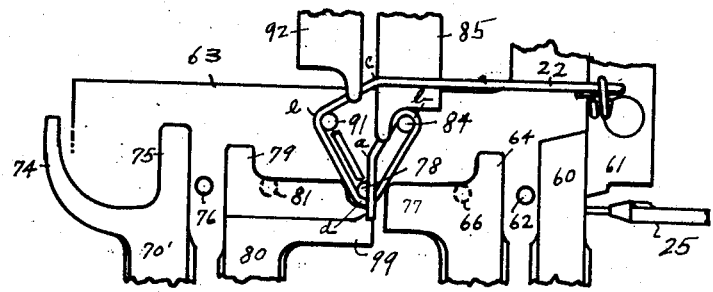
Figure 45:
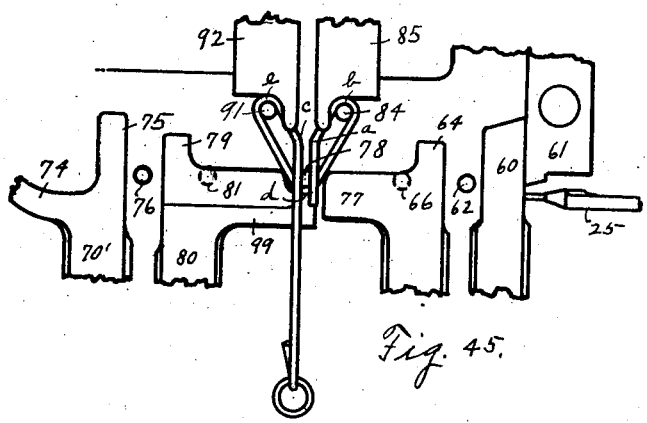

Fig. 39 is an enlarged fragmentary plan view of the pin forming mechanism.

Figure 46:
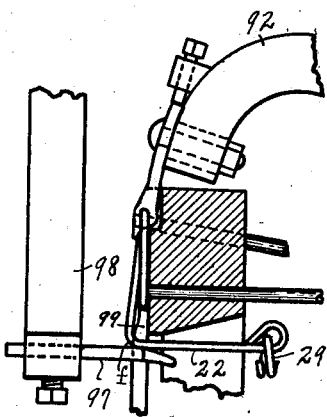

Figs. 40, 41, 42, 43, 44, and 45 are enlarged fragmentary side elevations, respectively, of the wire forming mechanism illustrating the mechanism in position to perform the successive steps in the formation of the pin, and Fig. 46 shows an enlarged fragmentary sectional view of the wire forming mechanism in position to perform the final step in the formation of the pin.

Referring now more particularly to the drawings wherein like numerals of reference designate similar parts in each of the figures, the numeral 1, refers to a drive shaft which is rotatably mounted in suitable bearings in the framework 2, and upon which is loosely mounted the pulley 3, and fixed upon which is the pulley 4. The drive shaft carries a fixed pinion 5 in mesh with the spur gear 6, which is fixed upon the cam shaft 7. The inner face of this spur gear 6 is formed into a mutilated bevel gear of two sections 8 and 9, each section preferably being formed with six teeth. These sections of said mutilated bevel gear operate the wire feed mechanism, hereinafter described, through the bevel pinion 10, to which an intermittent motion is transmitted by said mutilated gear. Each of the two sections of said bevel gear cause the pinion 10 to perform one-half of a rotation. The pinion 10 is fixed upon a short shaft 11, rotatable in a suitable bearing carried by the framework and the inner end of the shaft 11 carries a lock shoe 12, which rests against a rib 12', carried by the inner face of the gear 6, to prevent the rotation of the pinion 10 when not in mesh with the mutilated gear.

Figure 1:
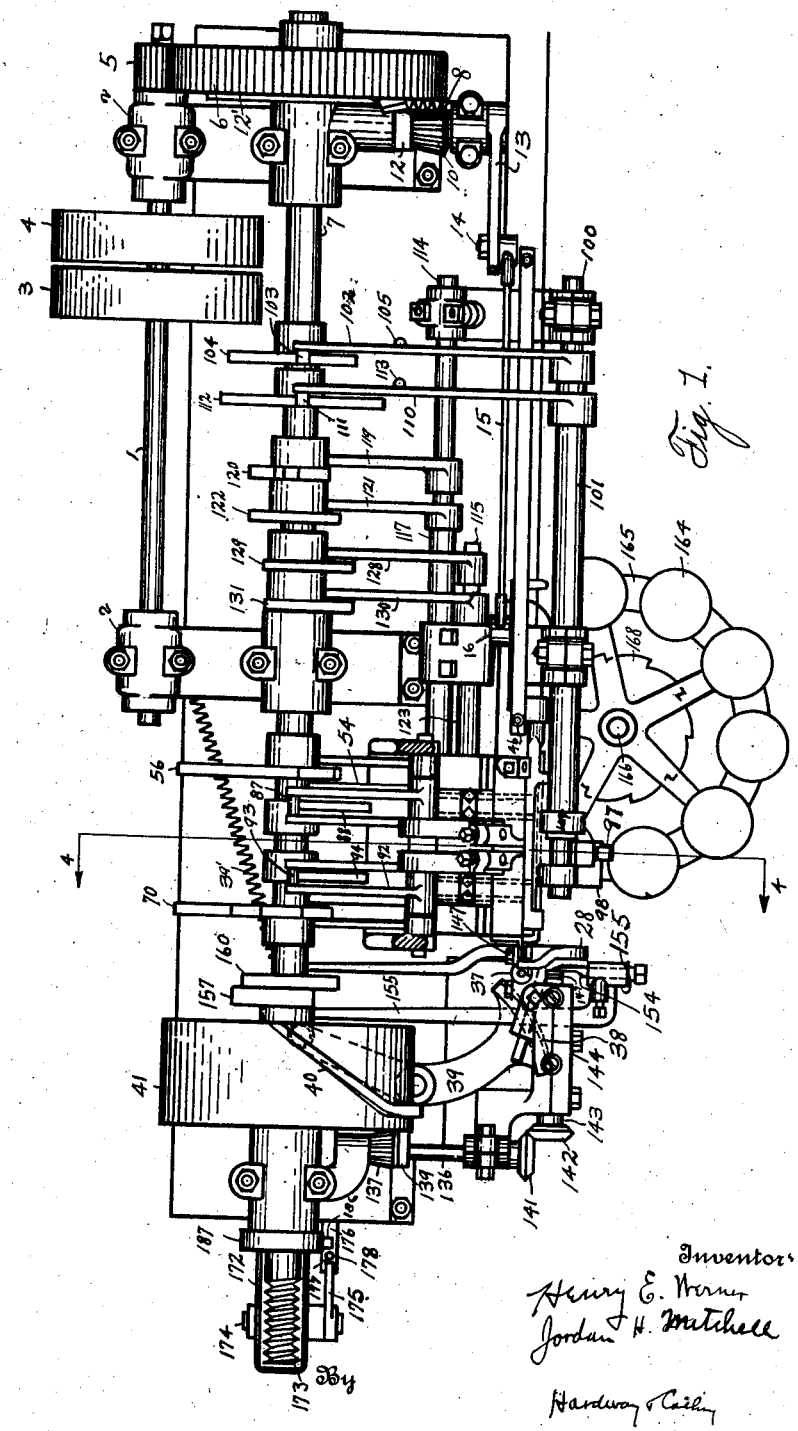
Figure 1, is a plan view of the complete machine.
Figure 4:
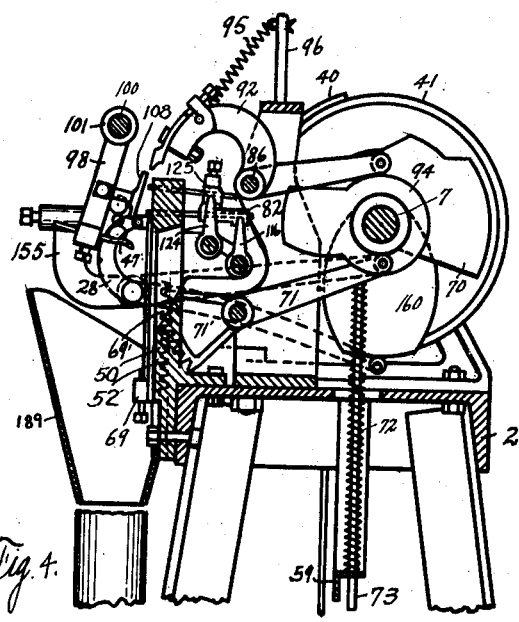
Fig. 4, is a transverse sectional view taken on the line 4—4 of Fig. 1.
Figure 3:
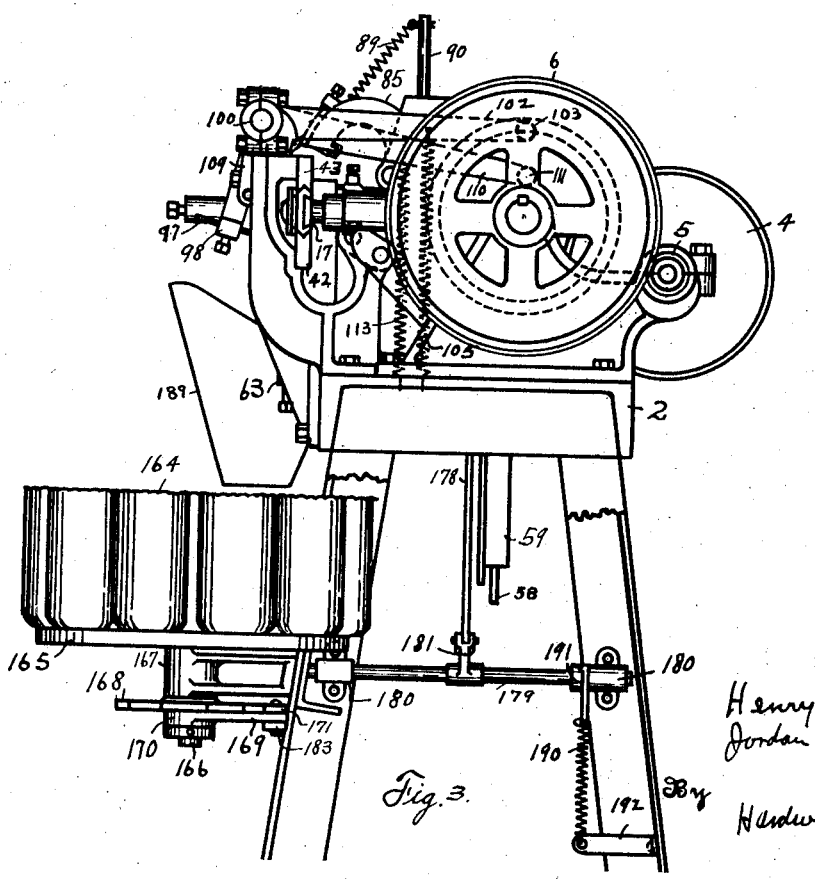
Fig. 3, is an end elevation thereof, with the near legs broken away for the sake of clearness.

Fixed upon the outer end of the shaft 11 is the crank 13, whose outer end is provided with an oblong slot to receive the shouldered crank pin 14, said slot permitting adjustment to vary the stroke of the feed mechanism as desired. The numeral 15 designates a connecting rod, one end of which has a bearing on the crank pin 14, and the other end of which is connected, through the pin 16, to the slide 17 through which said pin is screwed. The numeral 18, refers to a slide plate provided with a central oblong slot through which the pin 16 projects to permit a limited reciprocating movement of the slide 17 relative to said plate. The head of the pin 16 is formed into two oppositely disposed lugs 19, 19, to which the corresponding ends of the connecting links 20, 20, are pivoted. Wire clamps 21, 21, are pivoted at one end to the plate 18, and to their other ends, the links 20, 20, are pivoted, forming toggle joints. The feed wire 22, passes through the eye 23, of the outer plate 18, passing through the head of the pin 16, and between the inner ends of the clamp jaws 21, 21, and passes thence through the needle 24, and on through the eye formed in the free end of the guide arm 25. A forward thrust of the connecting rod 15 operates to impart a corresponding thrust to the slide 17, and to the links 20, operating through the clamp jaws 21, to cause the inner ends of said jaws to grip the wire, stopping the movement of the slide 17, relative to the plate 18, and causing said members to move together carrying the needle 24, which is supported by said plate, forwardly and seating the free end of the guide arm 25 into a corresponding recess in the guide block 26, carried by the frame and centering the wire, bringing it into alinement with the eye 27, of the transfer arm 28, and a further forward movement of the needle forces the free end of the wire through said eye 27, and through the split ring 29, formed as hereinafter described and held in the chambered recess 30 of said arm, said free end of the wire passing on through between the central stud 31 and eccentric lug 32 projecting from the end of the twister shaft 33 and spaced apart. The guide arm 25 is slidably mounted in suitable bearings 34 and 35, carried by the needle 24, and interposed between said bearings and surrounding said arm is a compression spring 36, one end of which rests against the bearing 34, and the other end of which is attached to the arm 25. When the free end of the arm 25 seats in the recess of the guide block 26, to center the wire, the further movement of the needle carries the free end of the wire through the split ring and between the adjustable stud 31, and lug 32, causing a compression of the spring 36, and upon the withdrawal of the needle upon back stroke, the guide arm is returned to its former position through the influence of said spring. The twister shaft 33 has a pinion 37 fixed thereon in mesh with a gear sector 38, into which one end of the pivoted arm 39 is formed. The other end of this arm has a roller bearing which is held, by the pull spring 39', against the cam 40 carried upon the periphery of the band wheel 41 which is fixed upon the cam shaft 7. The cam 40 is formed to actuate the arm 39, and causes a partial rotation of the shaft 33, through the sector 38, and thereby the lug 32 loops the free end of the wire around the stud 31, and also around the split ring lying in the recess 30 and the formation of the cam is such that when the loop is formed, the twister shaft is held against backward rotation for a time so as to hold the loop in position around the stud 31, until the proper time for its release and thereafter the spring 39' operates to pull the arm 39 in the opposite direction returning the twister shaft to its original position through the gear sector 38. While the loop is being formed, the feed mechanism is idle temporarily by reason of the fact that the section of the mutilated gear last operating the bevel pinion 10 has passed out of mesh therewith, but as soon as the free end of the wire is bent around the stud 31, to hold said end, the other section of said mutilated gear meshes with said pinion, causing a return of the feed mechanism. This return is effected through the crank 13, and the connecting rod 15. The pull of said connecting rod is first exerted through the pin 16, the links 20, 20, and the jaws 21, 21, to release said jaws from the wire and thereafter to return said mechanism, the same sliding on the wire, to a position for another forward movement. The plate 18 is slidably mounted in a track formed of the guide bars 42 and 43, shown in Figs. 1, 2 and 3. The bar 42 is fixed to the frame and has the upwardly extending bolts 44 and 45, and the bar 43 is spaced above the latter and is slidable on said bolts which pass through bearings therein. These bolts are fixed to the bar 42, and their upper ends are provided with suitable nuts 46 and 47, which are threaded thereon. Interposed between these respective nuts and the bar 43, and surrounding the corresponding bolts are the coil springs 48 and 49, which hold the guide bar 43 yieldingly against the plate 18. By means of said nuts, the pressure of the coil springs against the bar 43 may be regulated, the greater the pressure thereagainst, the tighter the clamp jaws 21, 21, will grip the wire 22 and vice versa.

The numeral 50 designates a slide, vertically movable in the frame. This slide has a rack 52 on its inner side in mesh with the sector 53, carried by one end of the pivoted lever 54. The other end of this lever has a roller which is held against the cam 56 by means of a push spring 57, said spring surrounding the rod 58, and being interposed between said lever and the plate 59. The upper end of the rod 58 is pivoted to the lever and it operates through a bearing in said plate. The cam 56 is mounted on the cam shaft 7, and is provided to actuate said lever so as to move said slide up and down. This slide carries a vertically adjustable blade 60, which coöperates with the fixed blade 61 to shear off a section of the wire, of sufficient length to form a single clothes pin, the wire having been carried between said blades by the feed mechanism as hereinbefore explained. After the wire has been severed, the slide 50 continues its upward movement, the corner opposite the cutting edge of the blade 60 forcing the end of the wire around the projecting end of the slidable pin 62, forming a bend or angle a, as shown in Fig. 19, in said wire. Thereupon the slide 50 dwells temporarily while the pin 62 recedes bringing its outer end flush with the outer face of the bearing member 63, through which said pin projects, and permitting the wire to pass. The slide 50 then continues its upward movement and the upwardly extending prong 64 of the blade 65 comes in contact with the wire and bends it around the outer end of the pin 66, which is slightly longer than the pin 62, forming the partial bend b, in the wire, shown in Fig. 19, whereupon the slide 50 again dwells while said pin 68 recedes, bringing its outer end flush with the outer face of the bearing member 63. The inner ends of the pins 62 and 66 are adjustably secured to a yoke 67, by means of set screws 68, and are operated in unison through a mechanism hereinafter described. Thereupon the slide 69 moves upwardly, being operated from the cam 70, through the pivoted lever 71, operatively connected therewith. The free end of said lever has a roller bearing which is held in contact with the cam 70, by the spring 72, which surrounds the rod 73, and is interposed between said lever and the bearing plate 59, in which said rod has a bearing. The opposite end of the lever 71 is formed into a gear sector 71', in mesh with a rack 69', on the inner face of the slide 69. Adjustably mounted in this slide is a blade 70', having the outer and inner prongs 74 and 75. The outer prong 74 operates to lift the loop with its split ring off of the stud 31, and simultaneously the prong 75 forms the bend c, Fig. 19, in the wire, around the outer end of the pin 76. Both slides 50 and 69 continue their upward movements, the laterally extending arm 77 of the blade 65 forming the partial bend d, Fig. 19, in the wire around the stationary pin 78, and the vertically extending prong 79 of the blade 80, forming the partial bend e, Fig. 19, in the wire around the outer end of the pin 81. The slide 69 now dwells for a moment while the pin 81 recedes to permit the wire to pass. The inner ends of the pins 76 and 81, are adjustably secured to the yoke 82 by means of set screws 83, said pins moving through bearings in the member 63, the latter pin being slightly longer than the former, and said pins being operated in unison through a mechanism hereinafter to be described. At this point the slide 50 has reached the end of its upward stroke and the partial bend b, Fig. 19, has been thrown around the projecting end of the pin 84, and the lever 85 completes the bend b, around said pin. This lever is mounted on a short shaft 86, and its inner end has the roller bearing 87, held in contact with the cam 88, by the pull spring 89, one end of which is attached to the outer end of the lever, and the other end of which is attached to the upper end of the rod 90, upstanding from the frame. The cam 88 is fixed upon the cam shaft 7, and operates the lever 85, as described. The numeral 91 indicates a pin which is slidable through a bearing in the member 63, but which during the preceding operation has been held withdrawn to allow the wire to pass, but at this point, in the operation, and after the wire has passed the same, the outer end of the pin 91 is projected from the bearing member and catches the partially formed bend e, and said bend is completed by the lever 92. This lever is mounted on the shaft 86, and its inner end has the roller bearing 93, held in contact with the cam 94, by the pull spring 95, one end of which is attached to the outer end of said lever, and the other end of which is attached to the upper end of the rod 96, upstanding from the frame. The cam 94 is fixed upon the cam shaft 7, and actuates said lever 92, as described. The pins 84 and 91 are operated independently through a mechanism hereinafter described. The straight end of the pin, carrying the eye, is now bent down, by the blade 97, of the lever 98, over the laterally projecting lug 99 of the blade 80, forming the bend f, Fig. 20, thus completing the pin which is thereupon released and drops into a receptacle which will be hereinafter described. The lever 98 is fixed upon one end of the shaft 100, which is rotatable in a suitable bearing, carried by the framework, and in the sleeve 101 as a bearing, and its other end has the fixed arm 102, whose free end has a roller bearing 103, in contact with the cam 104, which is fixed upon the cam shaft 7, and which actuates said lever. The roller bearing 103 is held in contact with said cam by the pull spring 105, one end of which is attached to said lever and the other end of which is secured to the frame. A projecting rib 106 is provided in the outer face of the bearing member 63, between the pins 91 and 78, the upper end of which is flush with said bearing member, but it inclines outwardly toward its lower end which is flush with the outer end of the stationary pin 78. This rib operates to guide the short end of the wire over said last mentioned pin as it is being bent around the pin 84, to prevent its engagement with said stationary pin and a corresponding recess 107 is formed in the adjacent face of the guide plate 108, as shown in Figs. 25, 26 and 27, to permit this movement of the wire. The plate 108 is detachably secured to the free end of the arm 109, which is fixed to one end of the sleeve 101. To the other end of this sleeve the lever 110 is fixed. The free end of this lever has a roller bearing 111, which is held in contact with the cam 112, fixed upon the cam shaft 7, by the pull spring 113, one end of which is attached to said lever 110, and the other end of which is secured to the frame. The cam 112, is formed to oscillate the sleeve 101, so as to withdraw the guide plate from the face of the bearing 63, during the movement of the wire feed mechanism to permit the passage of the needle, and upon the withdrawal of the needle it operates to clamp said plate against the wire to hold the wire in place during the formation of the pin. The plate 108 is provided with orifices in alinement with the respective slidable wire-forming pins, hereinbefore referred to, into which the outer ends of said pins project while the wire is being bent therearound. The cam 112, is also so formed that the guide plate will temporarily withdraw from the face of the bearing 63 to permit the free ends of the wire, being formed, to pass around while being operated on by the levers 85 and 92, and then again clamp the pin while the bend f, Fig. 20, is being formed therein by the blade 97, to complete the pin. Thereupon the guide plate is again withdrawn to release the pin and it is discharged into a container to be hereinafter described. Rotatably mounted in suitable bearings carried by the frame 51, are the shafts 114, and 115, and fixed to the former of which is the arm 116, whose free end plays in a notch in the under side of the yoke 82. The shaft 114 has a sleeve 117, fixed to which is the arm 118, whose free end plays in a notch in the under side of the yoke 67. The shaft 114 has a lever 119, fixed thereon whose free end carries the roller which is in contact with the cam 120, and the sleeve 117 has a similar lever 121, fixed thereon whose free end carries a roller bearing in operative contact with the cam 122. These cams operate through said levers to partially rotate the shaft 114, and sleeve 117, respectively, and oscillate the arms 116, and 118, back and forth to project and withdraw the corresponding pins 76, 81, 66 and 62, at the proper time as hereinbefore stated.

The shaft 115 is rotatable in suitable bearings and provided with the sleeve 123. Fixed to the shaft 115 is the arm 124, whose free end operates in a notch in the under side of the yoke 125, carried by the inner end of the pin 91, and the sleeve 123, has an arm 126 fixed thereto whose free end operates in a notch in the under side of the yoke 127, carried by the inner end of the pin 84. A long lever 128, is securely fastened to the other end of the shaft 115, and its free end is provided with a roller bearing in contact with the operative face of the cam 129. The sleeve 123, has a lever 130 fixed thereto whose free end carries a roller in contact with the operative face of the cam 131. The cams 120, 122, 129 and 131, positively operate said corresponding levers and the levers are returned through the pressure of the compression springs 132, 133, 134 and 135, which operate thereagainst.

Rotatably mounted in suitable bearings carried by the end of the framework is the countershaft 136, the inner end of which has the fixed bevel pinion 137 arranged to mesh with the gear sector 138, carried by the band wheel 41, which imparts intermittent rotations thereto. Fixed upon this shaft 136, is the lock shoe 139, having a flat face which bears against the opposing edge of said band wheel 41, to lock the countershaft against rotation when the pinion 137, is not in mesh with said sector 138, a section of said rim opposite said sector being cut away at 140, to permit the lock shoe and shaft to rotate. The outer end of said shaft has the fixed miter gear 141, which is in mesh with a corresponding miter gear 142, fixed upon the outer end of the shaft 143, which extends through the casing 144, and has suitable bearings therein. The opposite end of the shaft 143 has a roller 145. Rotatable in suitable bearings in the casing 144, is a short shaft 146, whose end projects from the casing and is formed into a roller 147, opposite the roller 145, and spaced therefrom. Between the shafts 143, and 146, and rotatable in suitable bearings in the casing is the spindle 148, whose end projects out between rollers 145 and 147. Within the casing these respective shafts and spindle have the intermeshing gear wheels 149, 150 and 151, respectively, fixed thereon, and from the former rotation is imparted to the latter.

The rollers 145 and 147, have corresponding annular periperal grooves therearound spaced uniformly. The wire 152, of which the rings are formed is fed onto the spindle as shown in Fig. 30, and is formed into a coil around the projecting end of the spindle 148, by the grooved rollers 145, and 147. The casing 144 has a fixed blade 153, coöperating with which is the movable blade 154. The movable blade is fixed to upwardly curved outer end of the pivoted lever 155, which has a bearing on the shaft 156, mounted in suitable bearings carried by the framework. The opposite end of this lever has a roller bearing which is held by the push spring 38, in contact with the cam 157, fixed upon the cam shaft. This spring surrounds the rod 159, which is attached at one end to said lever and whose other end slides through the bearing plate 59, against which the lower end of said spring rests. The coil of wire around the projecting end of the spindle 148, gradually feeds off of the end thereof, and is so geared that a turn or coil thereof will be fed off for each pin formed. The cam 157, is so formed that when a turn of wire has cleared the end of the spindle 149, the lever 156 will be operated, carrying the blade 154 across into coöperation with the fixed blade 153, to shear off and sever said ring and force it into the recess 30 of the transfer arm 28. Surrounding the shaft 156, is the coil spring 163, which forms a yieldable seat against which the transfer arm 28 rests and which permits said arm to yield, yet hold it against the severed wire with sufficient firmness to prevent it from falling out. This transfer arm is pivotally mounted on the shaft 156, and its inner end is extended, and has a roller bearing, held in contact with the cam 160, of the cam shaft 7, by the push spring 161. This spring surrounds the rod 162, which is attached to the extended end of the arm 28, and has a bearing through the bearing plate 59, against which the lower end of the spring 161 rests. The cam 160 actuates the arm 28 upon the formation of said ring, to carry the same across and into alinement with the guide block 26, and holds it in position to receive the free end of the wire 22, which is looped around it as hereinbefore explained.

For the purpose of receiving the discharged pins, a plurality of containers 164, have been provided which are concentrically arranged upon the rotatable disk 165. This disk is fixed to the upper end of a short shaft 166, which is rotatable in a bearing 167, carried by the framework. Fixed upon the shaft 166, is a ratchet wheel 168, and adjacent said wheel is the arm 169, one end of which has a loose bearing 170, on said shaft. The free end of said arm carries a dog 171, provided to engage with the teeth of said ratchet wheel 168. One end of the cam shaft 7 is formed into a screw gear 172, in mesh with a corresponding screw gear 173, fixed upon the transverse countershaft 174. One end of this countershaft has a cam 175, in alinement with the pin 176. This pin has a vertical bearing 177, through which the vertical rod 178 operates. A transverse shaft 179 is rotatably mounted in suitable bearings 180, 180, carried by the supporting legs of the framework and fixed to said shaft is an arm 181, to which the lower end of the rod 178 is pivoted. One end of the shaft 179 has an arm 182, fixed thereto, and a link 183, is pivoted at one end to the free end of the arm 182, and at its other end to the free end of the arm 169. The pin 178 is slidable in the bearing 177, and is provided with a yieldable seat 185, against which it operates, said seat normally holding the upper end of the rod 178 out of the path of the lug 186, hereinafter referred to. A completed clothes pin is formed during each rotation of the cam shaft 7, and the containers 164, are of sufficient capacity that the cam shaft 7 will rotate a sufficient number of times to form a sufficient number of pins to fill a single container during one rotation of the screw gear 173. When the cam 175 contacts with the outer end of the pin 176, it operates to depress said pin, overcoming the resistance of the resilient seat 185, with the result that the upper end of the rod 178 is carried into the path of the lug 186, which projects out from the collar 187, carried by said shaft. This lug imparts a downward thrust to the rod 178, which is transmitted through the arm 181, the shaft 179 and the arm 182, to the link 183, causing a partial rotation of the shaft 166, through the ratchet wheel 168, and carrying the next succeeding container underneath the receiving hopper 189, through which the discharged pins are conducted into the containers 164. As soon as the lug 186, passes the free end of the rod 178, the pressure of the resilient seat 185 will restore the pin 176, to its original position, bringing its outer end into the path of the cam 175. A spring 190, is attached at one end to the lever 191, projecting out from the shaft 179, and its other end is attached to the lever 192, carried by the corresponding supporting leg. The pull of this spring operates to exert a backward pull on the link 183, and to restore the dog 171 to its original position in readiness to engage with the next succeeding tooth of the ratchet wheel 168.

What we claim is:

1. A wire forming machine, including a reciprocating wire feed mechanism, adapted to engage with and feed one wire into the machine upon its forward stroke and to release the wire upon back stroke, a mechanism provided to form a second wire into independent rings, a mechanism adapted to engage with and form the free end of the first mentioned wire into a loop around said rings successively as formed and to secure the wire against backward movement on the back stroke of the feed mechanism, a device for severing a section of the first mentioned wire fed into the machine and a mechanism for forming said severed section into a clothes pin.

2. A wire forming machine including a reciprocating wire feed mechanism adapted to engage with and feed one wire into the machine upon its forward stroke and to release the wire upon back stroke, a mechanism provided to form a second wire into a coil, means for severing the turns of said coil, forming independent rings successively, means for carrying said rings as formed into alinement successively with said wire feed mechanism to permit the insertion of the free end of the first mentioned wire through said rings, a mechanism adapted to engage with and form the free end of the wire into a loop around said ring and to secure the wire against backward movement on the back stroke of the feed mechanism, a device for severing a section of the wire fed into the machine, and a mechanism for forming said severed section into a clothes pin.

3. A wire forming machine including a feed mechanism which feeds one wire into the machine, means engaging with the free end of the wire, and forming the same into a loop, a ring forming mechanism whereby a second wire is formed into a ring around which the loop is formed, means for severing a section of the first mentioned wire fed into the machine, and a wire forming mechanism which forms said severed section into a clothes pin.

4. In a device of the character described, a rotatable spindle adapted to receive one wire, a pair of grooved rollers adjacent said spindle and adapted to form the wire into a helix around the spindle, a fixed blade adjacent the spindle, a reciprocating blade cooperating with the fixed blade to sever the helices of wire successively as they pass from the free end of the spindle forming rings, a wire feed mechanism adapted to engage with and feed a second wire into the machine, a transfer arm receiving the rings from said blades and carrying them singly into alinement with said feed mechanism to permit the free end of the last mentioned wire to be passed through the alined ring and a mechanism engaging with the free end of said last mentioned wire and forming it into a loop around the ring through which it passes.

5. In a device of the character described, a rotatable spindle adapted to receive one wire, a pair of grooved rollers adjacent said spindle and adapted to form the wire into a helix around the spindle, a fixed blade adjacent the spindle, a reciprocating blade cooperating with the fixed blade to sever the helices of wire successively as they pass from the free end of the spindle forming rings, a reciprocating wire feed mechanism adapted to engage with and feed a second wire into the machine upon its forward stroke and to release the wire upon its back stroke, a transfer arm receiving the rings from said blades and carrying them singly into alinement with said feed mechanism to permit the free end of the last mentioned wire to be passed through the alined ring and a mechanism engaging with the free end of said last mentioned wire and forming it into a loop around the ring through which it passes.

6. In a machine of the character described, a wire feed mechanism including a tubular needle through which the wire passes, a guide arm yieldably mounted on the needle and whose free end is provided with an eye through which the wire passes, a slidably mounted support to which the needle is fixed, clamps carried by the support between which the wire passes, an intermittently actuated driving mechanism through which said feed mechanism is reciprocated, said driving mechanism being operatively connected with said clamps to cause them to clamp said wire upon forward stroke, and to release the wire upon back stroke, in combination with means for severing said wire into sections and means for forming said sections into clothes pins.

7. A wire forming machine including a feed mechanism which feeds the wire into the machine, means engaging with the free end of the wire and forming the same into a loop, means for severing a section of the wire fed into the machine, a wire forming mechanism which forms said severed section into a clothes pin, all in combination with a plurality of containers provided to receive the pins as discharged, means automatically bringing the containers in succession into position to receive the discharge pins, said means being connected with the wire forming mechanism, and operated thereby to shift the containers intermittently after each discharge of a predetermined number of pins.

8. A wire forming machine including a feed mechanism which feeds the oil into the machine, means for severing a section of the wire fed into the machine, a wire forming mechanism which forms said severed section into a clothes pin, all in combination with a plurality of containers provided to receive the pins as discharged, means automatically bringing the containers in succession into position to receive the discharged pins, said means being connected with the wire forming mechanism and operated thereby to shift the containers intermittently as discharged to determine the number of pins.

In testimony whereof we have signed our names to this specification in the presence of two subscribing witnesses.

HENRY E. WERNER.
JORDAN H. MITCHELL.

Witnesses:
IRENE I. BRUNS,
OLA M. SMITH.